(12) United States Patent
Burns (10) Patent No.: US 7,789,018 B2
(45) Date of Patent: Sep. 7, 2010

(54) GAS GENERATOR ASSEMBLY

(75) Inventor: Sean P. Burns, Almont, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 796 days.

(21) Appl. No.: 11/096,887

(22) Filed: Apr. 1, 2005

(65) Prior Publication Data

US 2005/0218637 A1 Oct. 6, 2005

Related U.S. Application Data

(60) Provisional application No. 60/559,352, filed on Apr. 2, 2004.

(51) Int. Cl.
*C06B 45/12* (2006.01)
*B60R 21/16* (2006.01)

(52) U.S. Cl. .................................. 102/288; 280/728.1

(58) Field of Classification Search ......... 102/288–291, 102/285, 286; 280/728.1
See application file for complete search history.

(56) References Cited

U.S. PATENT DOCUMENTS

| | | | |
|---|---|---|---|
| 3,397,639 A | 8/1968 | Alderfer |
| 3,606,377 A | 9/1971 | Martin |
| 3,721,456 A | 3/1973 | McDonald |
| 3,733,088 A | 5/1973 | Stephenson |

(Continued)

FOREIGN PATENT DOCUMENTS

JP 5-64015 8/1993

OTHER PUBLICATIONS

U.S. Appl. No. 11/191,291, Khandhadia et al.

(Continued)

*Primary Examiner*—Bret Hayes
(74) *Attorney, Agent, or Firm*—L.C. Begin & Associates, PLLC (57) ABSTRACT

A gas generant tablet (24) for use in a linear inflator (10). The tablet (24) includes a body portion (102) having a first end (104), a second end (106), and a longitudinal axis (T). A first projection (108) extends from the tablet first end (104) in a first direction, with at least a portion of the first projection (108) extending non-orthogonally with respect to the tablet longitudinal axis (T). A second projection (112) extends from the tablet second end (106) in a second direction generally opposite the first direction. At least a portion of the second projection (112) extends non-orthogonally with respect to the tablet longitudinal axis (T). The tablet (24) is shaped such that a cavity (25) is formed between adjacent tablets (24) when the tablets are stacked within a combustion chamber of the inflator (10). Also disclosed is an inflator (10) for use in an inflatable vehicle occupant protection system (200). The inflator (10) includes a longitudinal enclosure (22) having a substantially uniform cross-sectional area along at least a portion of the enclosure. The enclosure (22) defines an interior cavity (22c) for containing a quantity of a gas generant composition therein, and includes a plurality of apertures (40) formed therealong to enable fluid communication between the enclosure interior cavity (22c) and an exterior of the enclosure. A plurality of gas generant tablets (24) is stacked along the enclosure (22), the tablets being shaped such that a cavity (25) is provided between adjacent tablets (24) when the tablets are stacked within the enclosure (22).

20 Claims, 2 Drawing Sheets

U.S. PATENT DOCUMENTS

| | | |
|---|---|---|
| 3,785,674 A | 1/1974 | Poole et al. |
| 3,799,573 A | 3/1974 | Olsson et al. |
| 3,897,961 A | 8/1975 | Leising et al. |
| 3,904,221 A | 9/1975 | Shiki et al |
| 3,929,074 A | 12/1975 | San Miguel |
| 3,986,808 A | 10/1976 | Keith |
| 4,005,876 A | 2/1977 | Jorgensen et al. |
| 4,012,211 A | 3/1977 | Goetz |
| 4,200,615 A | 4/1980 | Hamilton et al. |
| 4,322,385 A | 3/1982 | Goetz et al. |
| 4,358,998 A | 11/1982 | Schneiter et al. |
| 4,408,534 A * | 10/1983 | Araki et al. ................. 102/288 |
| 4,781,645 A | 11/1988 | Kato |
| 4,846,368 A | 7/1989 | Goetz |
| 4,878,690 A | 11/1989 | Cunningham |
| 4,890,860 A | 1/1990 | Schneiter |
| 4,950,458 A | 8/1990 | Cunningham |
| 5,094,475 A | 3/1992 | Olsson et al. |
| 5,101,730 A * | 4/1992 | Bender et al. ................. 102/288 |
| 5,109,772 A | 5/1992 | Cunningham et al. |
| 5,139,588 A | 8/1992 | Poole |
| 5,211,224 A | 5/1993 | Bouldin |
| 5,308,370 A | 5/1994 | Kraft et al. |
| 5,322,322 A | 6/1994 | Bark et al. |
| 5,324,071 A | 6/1994 | Gotomyo et al. |
| 5,345,873 A * | 9/1994 | Lauritzen et al. ............. 102/290 |
| 5,368,329 A * | 11/1994 | Hock ......................... 280/741 |
| 5,409,259 A | 4/1995 | Cunningham et al. |
| 5,439,250 A | 8/1995 | Kokeguchi et al. |
| 5,443,286 A | 8/1995 | Cunningham et al. |
| 5,462,308 A | 10/1995 | Seki et al. |
| 5,464,249 A | 11/1995 | Lauritzen et al. |
| 5,482,315 A | 1/1996 | Chandler et al. |
| 5,503,079 A | 4/1996 | Kishi et al. |
| 5,503,428 A | 4/1996 | Awotwi et al. |
| 5,503,806 A | 4/1996 | Fulmer et al. |
| 5,540,154 A | 7/1996 | Wilcox et al. |
| 5,540,459 A | 7/1996 | Daniel |
| 5,542,704 A | 8/1996 | Hamilton et al. |
| 5,547,638 A | 8/1996 | Rink et al. |
| 5,551,343 A * | 9/1996 | Hock et al. ................. 102/288 |
| 5,562,303 A | 10/1996 | Schleicher et al. |
| 5,573,271 A | 11/1996 | Headly |
| 5,578,787 A * | 11/1996 | Kobari et al. ............... 102/288 |
| 5,588,670 A | 12/1996 | Storey et al. |
| 5,588,672 A | 12/1996 | Karlow et al. |
| 5,607,181 A | 3/1997 | Richardson et al. |
| 5,615,914 A | 4/1997 | Galbraith et al. |
| 5,623,115 A | 4/1997 | Lauritzen et al. |
| 5,626,360 A | 5/1997 | Lauritzen et al. |
| 5,635,665 A | 6/1997 | Kishi et al. |
| 5,682,013 A * | 10/1997 | Smith et al. ..................... 149/6 |
| 5,735,572 A | 4/1998 | Clark et al. |
| 5,743,556 A | 4/1998 | Lindsay et al. |
| 5,752,715 A | 5/1998 | Pripps et al. |
| 5,779,263 A | 7/1998 | Lane et al. |
| 5,826,904 A | 10/1998 | Ellis et al. |
| 5,827,996 A | 10/1998 | Yoshida et al. |
| 5,845,933 A | 12/1998 | Walker et al. |
| 5,868,424 A | 2/1999 | Hamilton et al. |
| 5,871,228 A | 2/1999 | Lindsay et al. |
| 5,908,204 A | 6/1999 | Smith |
| 5,941,563 A | 8/1999 | Schoenborn |
| 5,941,752 A | 8/1999 | Liebermann |
| 5,967,550 A | 10/1999 | Shirk et al. |
| 6,019,861 A | 2/2000 | Canterberry et al. |
| 6,029,994 A | 2/2000 | Perotto et al. |
| 6,032,979 A | 3/2000 | Mossi et al. |
| 6,039,820 A | 3/2000 | Hinshaw et al. |
| 6,051,158 A | 4/2000 | Taylor et al. |
| 6,053,110 A * | 4/2000 | Marchant et al. ............. 102/288 |
| 6,056,319 A | 5/2000 | Ruckdeschel et al. |
| 6,062,143 A | 5/2000 | Grace et al. |
| 6,077,371 A | 6/2000 | Lundstrom et al. |
| 6,129,023 A * | 10/2000 | Marsaud et al. ............. 102/288 |
| 6,142,518 A | 11/2000 | Butt et al. |
| 6,145,876 A | 11/2000 | Hamilton |
| 6,170,867 B1 | 1/2001 | Rink et al. |
| 6,176,517 B1 | 1/2001 | Hamilton et al. |
| 6,177,028 B1 | 1/2001 | Kanda et al. |
| 6,315,847 B1 | 11/2001 | Lee et al. |
| 6,336,651 B1 | 1/2002 | Mramor et al. |
| 6,347,566 B1 | 2/2002 | Rabotinsky et al. |
| 6,382,661 B1 | 5/2002 | Sutherland |
| 6,412,816 B1 | 7/2002 | Gast et al. |
| 6,416,599 B1 | 7/2002 | Yoshikawa et al. |
| 6,425,601 B1 | 7/2002 | Lewis |
| 6,497,429 B2 | 12/2002 | Matsumoto |
| 6,502,513 B1 * | 1/2003 | Barnes et al. ................. 102/288 |
| 6,595,546 B2 | 7/2003 | Smith |
| 6,595,547 B2 | 7/2003 | Smith |
| 6,601,871 B2 | 8/2003 | Fischer |
| 6,688,231 B1 | 2/2004 | Herrmann |
| 6,752,421 B2 | 6/2004 | Khandhadia et al. |
| 6,755,438 B2 | 6/2004 | Rink et al. |
| 6,805,377 B2 | 10/2004 | Krupp et al. |
| 6,846,013 B2 | 1/2005 | Smith |
| 6,846,014 B2 | 1/2005 | Rink et al. |
| 6,942,261 B2 | 9/2005 | Larsen et al. |
| 7,025,164 B2 | 4/2006 | Takimoto |
| 7,052,041 B2 | 5/2006 | McCormick |
| 7,080,854 B2 | 7/2006 | Burns et al. ................. 280/736 |
| 7,097,203 B2 | 8/2006 | Burns et al. ................. 280/741 |
| 7,192,055 B2 | 3/2007 | Stevens et al. ............. 280/741 |
| 7,243,946 B2 | 7/2007 | Stevens et al. ............. 280/741 |
| 7,293,798 B2 | 11/2007 | Burns et al. ................. 280/741 |
| 2002/0038948 A1 | 4/2002 | Yamamori et al. |
| 2003/0173761 A1 | 9/2003 | Rink et al. |
| 2003/0178828 A1 | 9/2003 | Rink et al. |
| 2003/0197354 A1 | 10/2003 | Beland et al. |
| 2004/0061316 A1 | 4/2004 | Elgadah et al. |
| 2004/0084885 A1 | 5/2004 | Burns et al. |
| 2005/0104349 A1 | 5/2005 | Stevens et al. |
| 2005/0116454 A1 | 6/2005 | Stevens |
| 2005/0151358 A1 | 7/2005 | Burns |
| 2005/0200103 A1 | 9/2005 | Burns et al. |
| 2005/0218638 A1 | 10/2005 | Burns et al. |
| 2006/0022444 A1 | 2/2006 | Khandhadia |
| 2006/0138763 A1 | 6/2006 | Brady |

OTHER PUBLICATIONS

Office Action for U.S. Appl. No. 11/067,040, filed Feb. 25, 2005 dated for Mar. 12, 2008.

Office Action for U.S. Appl. No. 11/191,291, filed Jul. 27, 2005, dated for Apr. 21, 2008.

Office Action for U.S. Appl. No. 11/191,291, filed Jul. 27, 2005, Mailing Date Dec. 28, 2009 (97).

Office Action for U.S. Appl. No. 11/191,291, filed Jul. 27, 2005 Mailing Date Jul. 7, 2009.

* cited by examiner

GAS GENERATOR ASSEMBLY

CROSS REFERENCE TO RELATED APPLICATIONS

This application claims the benefit of provisional application Ser. No. 60/559,352 filed on Apr. 2, 2004.

BACKGROUND OF THE INVENTION

The present invention relates to inflators for vehicle airbags and, more particularly, to a linear inflator which discharges inflation gas along the length of the inflator for use in side impact or head curtain airbag systems.

Due to airbag module size restrictions, it is desirable to pack as much gas generant as possible in a given volume of an inflator combustion chamber. However, linear inflators used in side impact or head curtain airbag systems should be loaded with a consistent and uniformly distributed mass of gas generant to help ensure a constant propagation rate of the combustion reaction along the inflator and to help ensure generation of a relatively constant and predictable gas pressure within an associated airbag. This is because the total volume of gas generated and the mass flow rate of the gas generated will vary based on the void volume (i.e., volume not occupied by gas generant) in the combustion chamber. In addition, if too little void volume is provided in a linear inflator, inflation gas flow will be restricted, resulting in a high operating pressures and possible mechanical failure of the inflator. Also, the time between first ignition of the gas generant at a first end of the linear inflator and combustion of the final portion of gas generant at an opposite end of the inflator (i.e., the combustion propagation time) is very important. This propagation time is dependent upon the overall void volume within the combustion chamber and the distribution of the void volume along the combustion chamber.

In inflator designs having a combustion chamber with a relatively small diameter and relatively large length, it may be difficult to provide the desired uniform distribution of gas generant along the combustion chamber. Although an extrudable gas generant could be used, it is often desirable to use a gas generant that is produced on a rotary tablet press. However, the positioning and orientation of gas generant tablets in a long, narrow combustion chamber introduces unique problems with regard to uniformity of gas generant distribution.

SUMMARY OF THE INVENTION

The present invention includes a gas generant tablet for use in a linear inflator in an inflatable vehicle occupant protection system. The tablet includes a body portion having a first end, a second end, and a longitudinal axis. A first projection extends from the tablet first end in a first direction, with at least a portion of the first projection extending non-orthogonally with respect to the tablet longitudinal axis. A second projection extends from the tablet second end in a second direction generally opposite the first direction. At least a portion of the second projection extends non-orthogonally with respect to the tablet longitudinal axis. The tablet is shaped such that a cavity is formed between adjacent tablets when the tablets are stacked within a combustion chamber of the inflator.

Also disclosed is an inflator for use in an inflatable vehicle occupant protection system. The inflator includes a longitudinal enclosure having a substantially uniform cross-sectional area along at least a portion of the enclosure. The enclosure defines an interior cavity for containing a quantity of a gas generant composition therein, and includes a plurality of apertures formed therealong to enable fluid communication between the enclosure interior cavity and an exterior of the enclosure. A plurality of gas generant tablets is stacked along the enclosure, the tablets being shaped such that a cavity is provided between adjacent tablets when the tablets are stacked within the enclosure.

DETAILED DESCRIPTION

Figure 1:
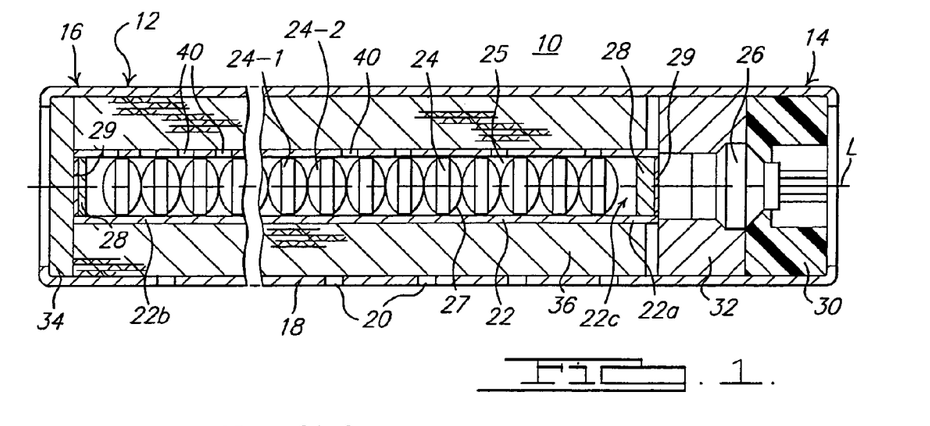
FIG. 1 is a cross-sectional side view showing the general structure of an inflator in accordance with the present invention.

FIG. 1 shows a cross-sectional view of an inflator 10 in accordance with the present invention. Inflator 10 is preferably constructed of components made from a durable metal such as carbon steel or iron, but may also include components made from tough and impact resistant polymers, for example. One of ordinary skill in the art will appreciate various methods of construction for the various components of the inflator. U.S. Pat. Nos. 5,035,757, 6,062,143, 6,347,566, U.S. patent application Ser. No. 2001/0045735, WO 01/08936, and WO 01/08937 exemplify typical designs for the various inflator components, and are incorporated herein by reference in their entirety, but not by way of limitation.

Referring to FIG. 1, inflator 10 includes a tubular housing 12 having a pair of opposed ends 14, 16 and a housing wall 18 extending along a longitudinal axis L. Housing 12 may be cast, stamped, extruded, or otherwise metal-formed. A plurality of gas exit apertures 20 are formed along housing wall 18 to permit fluid communication between an interior of the housing and an airbag (not shown).

A longitudinal gas generant enclosure 22 is radially inwardly spaced from housing 12 and is coaxially oriented along longitudinal axis L. Enclosure 22 has an elongate, substantially cylindrical body defining a first end 22a proximate end 14 of housing 12, a second end 22b, and an interior cavity 22c for containing a quantity of a gas generant composition 24 therein. Enclosure first end 22a is positioned to enable fluid communication between an igniter 26 and enclosure interior cavity 22c. Enclosure 22 extends along longitudinal axis L from housing end 14 toward housing end 16.

Enclosure 22 is provided with a plurality of gas exit apertures 40 formed therealong to facilitate propagation of a combustion reaction of gas generant composition 24 along the enclosure, in a manner known in the art. Apertures 40 are preferably formed 180° opposite housing gas exit apertures 20, as shown in FIG. 1. Enclosure 22 may be formed as known in the art, and may for example be roll formed from sheet metal and then perforated to produce apertures 40. Enclosure apertures 40 are environmentally sealed with an aluminum tape 42 or any other effective seal. Enclosure 22 may be environmentally sealed at first end 22a and second end 22b with an aluminum tape 29 or any other effective seal.

A quantity of a known auto-ignition composition 28 may be positioned at ends of the stack of gas generant material 24, proximate enclosure first end 22a and enclosure second end 22b, in ignitable communication with first gas generant 24.

An igniter 26 is secured to inflator 10 such that the igniter is in communication with an interior of gas generant enclosure 22, for igniting gas generant 24 upon occurrence of a crash event. In the embodiment shown, igniter 26 is positioned within an annular bore of an igniter closure 30. Igniter 26 may be formed as known in the art. One exemplary igniter construction is described in U.S. Pat. No. 6,009,809, herein incorporated by reference.

Igniter closure 30 is crimped or otherwise fixed to a first end 14 of housing 12. A first endcap 32 is coaxially juxtaposed adjacent igniter closure 30 to form, in conjunction with igniter closure 30, an inner housing for igniter 26. First endcap 32 also provides a closure for gas generant enclosure 22. A second endcap 34 is crimped or otherwise fixed to a second end 16 of housing 12. An O-ring or other compressive seal (not shown) may be provided along surfaces of either (or both) of endcaps 32 and 34 residing opposite respective ends of housing 12, for providing a gas tight seal to prevent migration of inflation gases through the ends of the inflator. Endcaps 32 and 34 and igniter closure 30 may be cast, stamped, extruded, or otherwise metal-formed. Alternatively, endcaps 32 and 34 may be molded from a suitable polymer.

A filter 36 may be incorporated into the inflator design for cooling gases generated by combustion of gas generant 24 and for filtering particulates from the gases. In general, filter 36 is positioned between gas generant 24 and apertures 20 formed along inflator housing wall 18. In the embodiment shown in FIG. 1, filter 36 is positioned exterior of gas generant enclosure 22 intermediate enclosure 22 and housing wall 18 and extends between first endcap 32 and second endcap 34. Filter 36 substantially occupies the annular space between gas generant enclosure 22 and housing wall 18. The filter may be formed from any of a variety of materials (for example, a carbon fiber mesh, wire or sheet) known in the art for filtering gas generant combustion products.

Figure 1A:
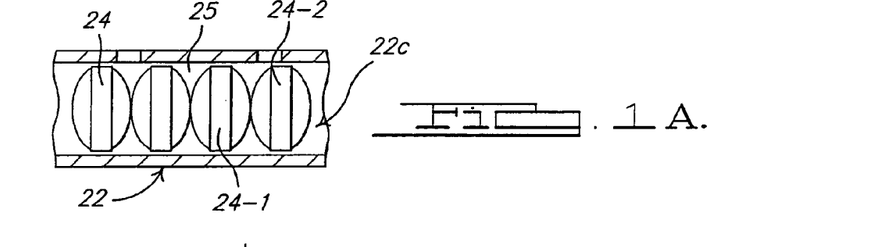
FIG. 1A is a partial sectional view of gas generant tablets stacked within a gas generant enclosure of the inflator shown in FIG. 1.

Referring to FIGS. 1 and 1A, a plurality of gas generant tablets 24 is stacked side by side along the length of enclosure 22. As seen in FIG. 1, tablets 24 are shaped or configured to advantageously create a cavity 25 between adjacent tablets 24. These cavities 25 contribute to the provision of a void volume within enclosure 22, thereby enhancing the burn characteristics of tablets 24 when they are ignited. An alternative arrangement of the gas generant along the length of the enclosure may be provided. However, any arrangement of gas generant along the enclosure preferably provides both a substantially uniform average distribution of gas generant along the length of the enclosure, and a volume of air space between adjacent gas generant tablets 24.

Typically, the gas generant tablets of the present invention are incorporated into an inflator having a combustion chamber with a relatively small diameter and relatively large length. For example, in one exemplary embodiment, the inner diameter of enclosure 22 is within the range 0.21 inches to 0.32 inches.

It has been found preferable that the tablets be substantially identical and formed with features that provide a cavity 25 between the tablets when the tablets are stacked in contact with each other along interior cavity 22c of enclosure 22. The shapes and dimensions of these features may be adjusted to vary the volume of cavities 25 as desired, thereby affecting the combustion parameters. It has been determined that, for optimum combustion, a preferred packing factor (defined as the ratio of the total volume of gas generant to the total volume of the combustion chamber) is 35-65%. A more preferred range is 45-55%. The features of gas generant tablets 24 of the present invention also aid in ensuring that a desired orientation of the tablets within enclosure 22 is achieved and maintained. In addition, to help ensure that the desired orientation of tablets 24 is achieved and maintained within enclosure 22, tablets 24 are also dimensioned such that the clearance between the tablet diameter dimension D (described below) and an inner diameter of enclosure 22 is substantially equal for all tablets 24 positioned within enclosure 22.

Figure 2:
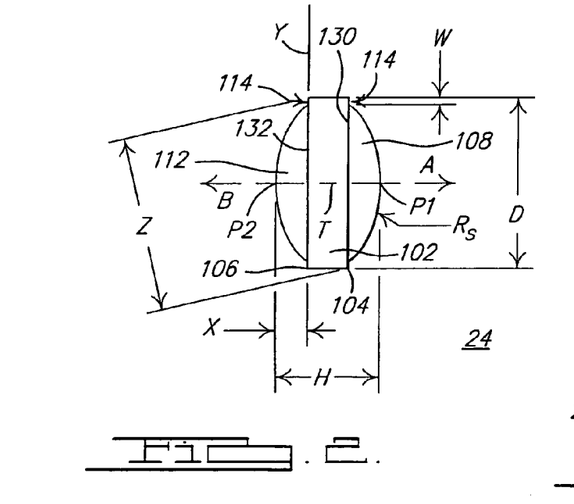
FIG. 2 is a is a side view of a first embodiment of a gas generant tablet for use in an inflator in accordance with the present invention.

FIGS. 1 and 1A shows adjacent ones 24-1 and 24-2 of gas generant tablets 24 stacked in contact with each other within enclosure 22. FIG. 2 is a more detailed view of a first embodiment of a gas generant tablet 24 in accordance with the present invention. Gas generant tablet 24 includes a substantially cylindrical body portion 102 having a first end 104, a second end 106, a longitudinal axis T and a diameter D. Body portion 102 terminates along a first edge 130 at first end 104 and along a second edge 132 at second end 106. A first projection 108 extends from first end 104 in a first direction indicated by arrow "A". At least a portion of first projection 108 extends non-orthogonally with respect to longitudinal axis T. That is, at least a portion of first projection 108 is inclined with respect to axis T at an angle other than 90°. Similarly, a second projection 112 extends from body portion second end 106 in a second direction "B", generally opposite first direction "A". At least a portion of second projection 112 extends non-orthogonally with respect to longitudinal axis T. That is, at least a portion of projection 112 is inclined with respect to axis T at an angle other than 90°.

In the embodiment shown in FIG. 2, on each tablet 24, the dimensions of first projection 108 are substantially the same as the dimensions of second projection 112. Also in the embodiment shown in FIG. 2, first projection 108 and second projection 112 are convex and spherical and have a radius $R_S$. A height dimension H of the gas generant tablet is defined as a distance along longitudinal axis T between a point P1 at which the longitudinal axis intersects first projection 108 and a point P2 at which the longitudinal axis intersects second projection 112. A dome dimension X is defined as a distance along longitudinal axis T between a plane Y including land portion 114 and extending substantially perpendicular to axis T, and a point P2 at which the longitudinal axis intersects second projection 112.

Figure 2A:
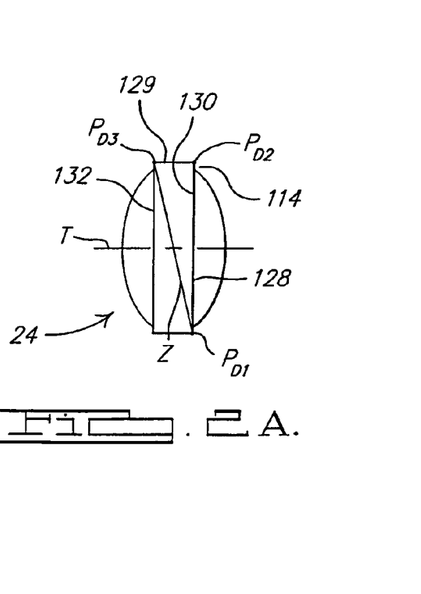
FIG. 2A is the view of the gas generant tablet shown in FIG. 2, showing a diagonal dimension of the tablet.

Referring to FIG. 2A, a diagonal Z of the gas generant tablet is defined by constructing a line 128 from a point $P_{D1}$ located along first edge 130 of the tablet through longitudinal axis T, and intersecting first edge 130 at a point $P_{D2}$ diametrically opposite $P_{D1}$. A line 129 is then constructed from $P_{D2}$ extending parallel with axis T along the periphery of body portion 102 to a point $P_{D3}$ along a second edge 132. Diagonal Z is a line extending through axis T and connecting points $P_{D1}$ and $P_{D3}$.

As seen in FIGS. 1, 1A, and 2, the angled orientation of first projection 108 on tablet 24-1 helps ensure that at least a portion of first projection 108 is recessed from an opposing second projection 112 of an adjacent gas generant tablet 24-2, thereby providing a cavity 25 between adjacent ones of the gas generant tablets. The dimensions and configurations of the tablet first projections 108 and second projections 112 can be controlled to provide a cavity having any one of a range of volumes, thereby permitting the void space between the gas generant tablets to be adjusted to affect combustion propagation in a desired manner.

Referring again to FIG. 2, tablet 24 may further include a land portion 114 extending from a periphery of body portion 102 toward longitudinal axis L to circumscribe first projection 108 and second projection 112. Land portion 114 extends along a plane substantially perpendicular to longitudinal axis T. The width W of land portion 114 between the periphery of body portion 102 and first projection 108 is substantially constant along the extent of land portion 114. Similarly, the width of land portion 114 between the periphery of body portion 102 and second projection 112 is substantially constant along the extent of land portion 114.

FIGS. 1 and 1A show a preferred stacking of gas generant tablets 24 within enclosure 22. Here, the tablets are stacked consistently down the entire length of the enclosure, resulting in a consistent packaging factor and a consistent gap between the outer diameter of the tablets and the inner diameter of the enclosure.

Figure 3:
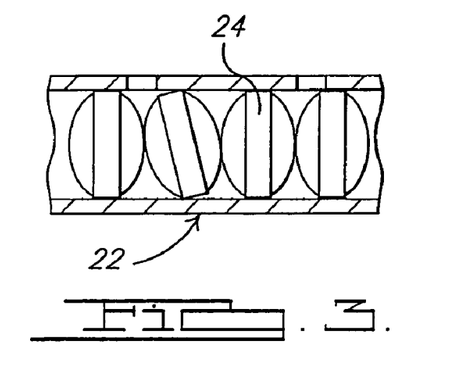
FIG. 3 is a partial cross-sectional view of the inflator of FIG. 1 showing a potential mode of misalignment of gas generant tablets within the inflator.

Referring again to FIG. 2, if the tablet diagonal Z or the largest dimension of the tablet is larger than the inner diameter of enclosure 22, tablet projections 108 and 112 may not lie against each other as shown in FIGS. 1 and 1A. This condition is illustrated in FIG. 3. Even if tablets 24 are loaded into enclosure 22 at the entrance to the tube in a flat position, the tablets may rotate while traveling down the length of enclosure 22. In this case, a tablet may become wedged in the enclosure, thereby preventing further loading of gas generant tablets 24 into the enclosure. This may also result in undesirable inconsistencies in the void volume within the enclosure. Thus, tablet diagonal Z or the largest dimension of the tablet is preferably less than or equal to the enclosure inner diameter.

Figure 4:
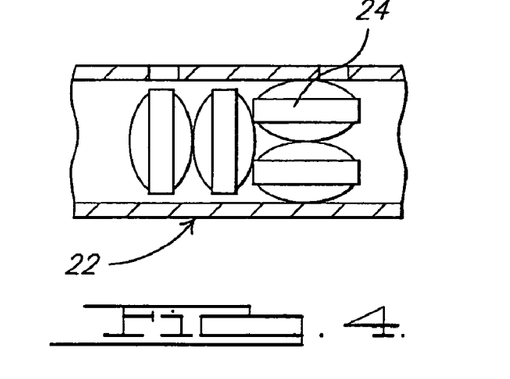
FIG. 4 is a partial cross-sectional view of the inflator of FIG. 1 showing another potential mode of misalignment of gas generant tablets within the inflator.

Referring to FIG. 4, if the dimensions of tablets 24 are too small relative to the inner diameter of enclosure 22, tablets 24 may be able to stack laterally across the inner diameter of enclosure 22. This results in inconsistencies in gas generant distribution and void volume since some tablets will be properly oriented while other tablets are oriented vertically.

If the tablet diameter D is too large relative to the enclosure inner diameter, tablets 24 may only be insertable into enclosure 22 in the vertical orientation shown in FIG. 4, approximately 90° from the desired stacking orientation shown in FIG. 1A. In addition, if the ratio of tablet diameter to tablet height is too low, tablet projections 108 and 112 may not lay against each other as shown in FIGS. 1 and 1A, due to the tendency of the tablets to settle and remain in the orientation having the lowest center of gravity. Because of practical limitations in the production process, the diameter-to-height ratio will generally be larger than 1.0. It has been found that a diameter-to-height ratio of greater than 1.3 is desirable to have the tablets lay against each other along respective opposing projections 108 and 112 as shown in FIGS. 1 and 1A.

Examples of gas generant compositions suitable for use in the present invention are disclosed in U.S. Pat. Nos. 5,035,757, 5,872,329, 6,074,502, 6,287,400, 6,306,232 and 6,475,312, each incorporated herein by reference. Other suitable compositions are set forth in U.S. patent application Ser. Nos. 10/407,300 and 60/369,775, incorporated by reference herein. The range of suitable gas generants is not limited to those described in the cited patents.

The following examples illustrate the principles of the present invention. In all examples, the same gas generant formulation was used and tablets were pressed on a rotary pressed to a density of 2.25 g/cm3. The tablets were tested in the inflator shown in FIG. 1. In each set of examples (1-3, 4-6, and 7-9), one of the characteristic dimensions of tablet 24 was varied in order to ascertain the effects of tablet dimensional variations on such factors as combustion propagation, packing factor, and the ability to consistently load and maintain tablets 24 in enclosure 22 in the preferred stacking orientation. Other tablet dimensions were held constant.

Examples 1-3. For these tests, the enclosure had an inner diameter of 0.305 inches, while the tablets had a constant diameter D of 0.250 inches, a dome dimension X of 0.040 inches, and land W of 0.010 inches. The tablet height H was varied.

| | Ex 1 | Ex 2 | Ex 3 |
|---|---|---|---|
| Tablet Height H (in) | 0.145 | 0.165 | 0.185 |
| ½ (Enclosure inner diameter − tablet diameter D) (mm) | 0.70 | 0.70 | 0.70 |
| ½ (Enclosure inner diameter − tablet diagonal Z) (mm) | 0.59 | 0.62 | 0.43 |
| Enclosure inner diameter − 2 (tablet height H) (mm) | 0.38 | 0.64 | 1.65 |
| Packing factor (%) | 46 | 49 | 51 |
| Tablet Diameter-height ratio (D/H) | 1.7 | 1.5 | 1.3 |

EXAMPLE 1

Loading and performance were inconsistent because the tablets can stack vertically side by side. In this case, it is believed that the inconsistencies resulted from the tablet height being too small relative to the inner diameter of enclosure 22.

EXAMPLE 2

Tablet loading and performance of the inflator were consistent.

EXAMPLE 3

Loading and performance were inconsistent because not all tablets stack on the domed side. In this instance, it is believed that the tablet height was increased to the point where the diameter-to-height ratio fell below the value needed to help ensure that adjacent tablets stacked along their domed sides, as shown in FIG. 1A.

EXAMPLES 4-6

For these tests, the enclosure had an inner diameter of 0.305 inches, while the tablets had a constant height H of 0.165 inches, a dome dimension X of 0.040 inches, and land W of 0.010 inches. The tablet diameter D was varied.

| | Ex 4 | Ex 5 | Ex 6 |
|---|---|---|---|
| Tablet Diameter D (in) | 0.23 | 0.25 | 0.27 |
| ½ (Enclosure inner diameter − tablet diameter D) (mm) | 0.95 | 0.70 | 0.45 |
| ½ (Enclosure inner diameter − tablet diagonal Z) (mm) | 0.76 | 0.52 | 0.28 |

-continued

|  | Ex 4 | Ex 5 | Ex 6 |
|---|---|---|---|
| Enclosure inner diameter − 2 (tablet height H) (mm) | 0.64 | 0.64 | 0.64 |
| Packing factor (%) | 41 | 49 | 57 |
| Tablet Diameter-height ratio (D/H) | 1.4 | 1.5 | 1.6 |

EXAMPLE 4

Due to the relatively low tablet diameter in this example, the packing factor was too low, resulting in the need for a larger inflator.

EXAMPLE 5

Tablet loading and performance of the inflator were consistent.

EXAMPLE 6

Due to the relatively high tablet diameter in this example, the packing factor was too high, resulting in mechanical failure of tube due to insufficient void volume in the enclosure.

EXAMPLES 7-9

For these tests, the propellant tube had an inner diameter of 0.305 inches, while the tablets had a constant height H of 0.165 inches, and land W of 0.010 inches. The tablet dome dimension X was varied.

|  | Ex 7 | Ex 8 | Ex 9 |
|---|---|---|---|
| Dome dimension X (in) | 0.020 | 0.040 | 0.060 |
| ½ (Enclosure inner diameter − tablet diameter D) (mm) | 0.70 | 0.70 | 0.70 |
| ½ (Enclosure inner diameter − tablet diagonal Z) (mm) | 0.32 | 0.52 | 0.65 |
| Enclosure inner diameter − 2 (tablet height H) (mm) | 0.64 | 0.64 | 0.64 |
| Packing factor (%) | 58 | 49 | 41 |
| Tablet Diameter-height ratio (D/H) | 1.5 | 1.5 | 1.5 |

EXAMPLE 7

Due to the relatively low dome dimension X, the main portions of adjacent tablets were spaced too closely together (i.e., the packing factor was too high), resulting in mechanical failure of tube due to insufficient void volume in the enclosure.

EXAMPLE 8

Tablet loading and performance of the inflator were consistent.

EXAMPLE 9

Due to the relatively high dome dimension X, the main portions of adjacent tablets were spaced too far apart (i.e., the packing factor was too low), resulting in the need for a larger inflator.

Figure 5:
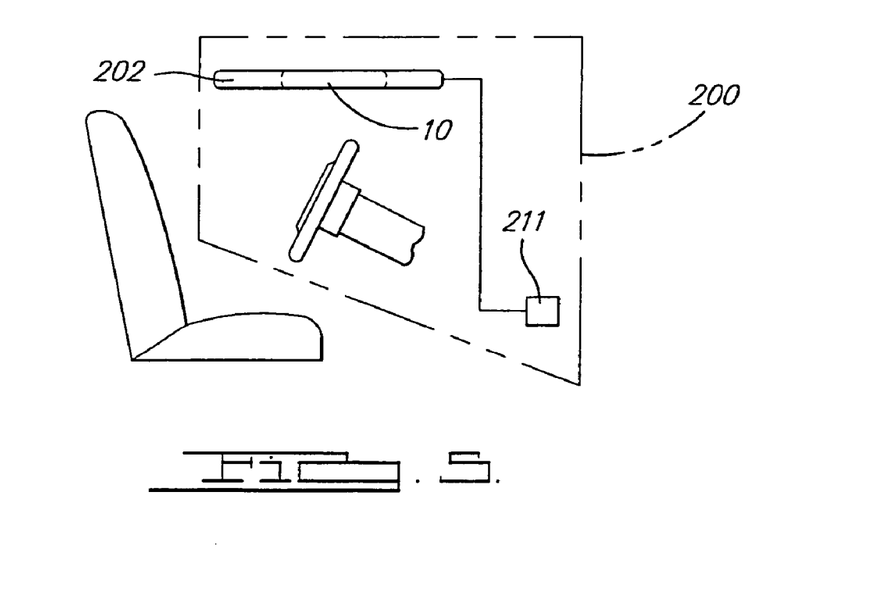
FIG. 5 is a schematic representation of an exemplary vehicle occupant restraint system incorporating an inflator in accordance with the present invention.

Referring now to FIG. 5, an inflator constructed in accordance with the principles outlined above may be incorporated into a vehicle occupant restraint system 200. Vehicle occupant restraint system 200 includes at least one airbag 202 and an inflator 10 constructed in accordance with the present invention and coupled to airbag 202 so as to enable fluid communication with an interior of the airbag. Vehicle occupant restraint system 200 may be in operative communication with a crash event sensor 211 which communicates with a known crash sensor algorithm that signals activation of vehicle occupant restraint system 200 via, for example, activation of airbag inflator 10 in the event of a collision.

It should be understood that the preceding is merely a detailed description of one embodiment of this invention and that numerous changes to the disclosed embodiment can be made in accordance with the disclosure herein without departing from the spirit or scope of the invention. The preceding description, therefore, is not meant to limit the scope of the invention. Rather, the scope of the invention is to be determined only by the appended claims and their equivalents.

The invention claimed is:

1. A gas generant tablet comprising:
 a body portion having a first end, a second end, and a longitudinal axis;
 a first projection extending from the first end in a first direction, at least a portion of the first projection extending non-orthogonally with respect to the longitudinal axis;
 a second projection extending from the second end in a second direction generally opposite the first direction, at least a portion of the second projection extending non-orthogonally with respect to the longitudinal axis; and
 a land portion extending from a periphery of the body portion toward the longitudinal axis to substantially circumscribe at least one of the first projection and the second projection,
 wherein at least one of the first projection and the second projection is substantially spherical and covers a majority of the periphery.

2. The gas generant tablet of claim 1 wherein the dimensions of the first projection are substantially the same as the dimensions of the second projection.

3. The gas generant tablet of claim 1 wherein at least one of the first projection and the second projection is spherical.

4. The gas generant tablet of claim 1 further comprising a land portion extending from a periphery of the body portion toward the longitudinal axis to circumscribe at least one of the first projection and the second projection.

5. The gas generant tablet of claim 1 wherein the land portion extends along a plane substantially perpendicular to the longitudinal axis.

6. The gas generant tablet of claim 1 wherein a width of the land portion between the periphery of the body portion and the at least one of the first projection and the second projection is substantially constant along the extent of the land portion.

7. The gas generant tablet of claim 1 wherein at least one of the first projection and the second projection is convex.

8. The gas generant tablet of claim 1 wherein the body portion is substantially cylindrical.

9. The gas generant tablet of claim 1 wherein the body portion is substantially cylindrical and has a diameter,
 a height of the gas generant tablet is defined as a distance along the longitudinal axis between a point at which the longitudinal axis intersects the first projection and a point at which the longitudinal axis intersects the second projection; and the ratio of the diameter to the height is greater than 1.0.

10. The gas generant tablet of claim 9 wherein and the ratio of the diameter to the height is greater than 1.3.

11. An inflator for use in an inflatable vehicle occupant protection system, the inflator comprising:

a longitudinal enclosure having a substantially uniform cross-sectional area along at least a portion of the enclosure, the at least a portion of the enclosure defining an interior cavity for containing a quantity of a gas generant composition therein, the at least a portion of the enclosure including a plurality of apertures formed therealong to enable fluid communication between the enclosure interior cavity and an exterior of the enclosure; and a plurality of gas generant tablets stacked along the at least a portion of the enclosure, each of the tablets having a body portion at least one substantially spherical projection extending from the body portion, and a land portion from a periphery of the body portion toward the longitudinal axis to substantially circumscribe the substantially spherical projection wherein the at least one substantially spherical projection covers a majority of the periphery.

12. The inflator of claim 11 wherein the body portion of each tablet has a first end, a second end, and a longitudinal axis and wherein each of the tablets includes:

a first projection extending from the first end in a first direction, at least a portion of the first projection extending non-orthogonally with respect to the longitudinal axis; and a second projection extending from the second end in a second direction generally opposite the first direction, at least a portion of the second projection extending non-orthogonally with respect to the longitudinal axis.

13. The inflator of claim 12 wherein the dimensions of the first projection are substantially the same as the dimensions of the second projection.

14. The inflator of claim 12 wherein the ratio of a total volume of the plurality of gas generant tablets stacked along the at least a portion of the enclosure to a total volume of the interior cavity of the at least a portion of the enclosure is in the range 0.35-0.65.

15. The inflator of claim 14 wherein a ratio of a total volume of the plurality of gas generant tablets stacked along the at least a portion of the enclosure to a total volume of the interior cavity of the at least a portion of the enclosure is in the range 0.45-0.55.

16. The inflator of claim 12 wherein the enclosure is substantially cylindrical and has an inner diameter;

the body portion of at least one of the gas generant tablets terminates at a first edge proximate the tablet first end;

the body portion of the at least one of the gas generant tablets terminates at a second edge proximate the tablet second end;

a line extending from a first point along the first edge through the longitudinal axis intersects a second point along the first edge;

a line from the second point along the first edge extending substantially parallel with the longitudinal axis intersects a point along the second edge;

a diagonal dimension of a gas generant tablet is defined by a distance between the first point along the first edge and the point along the second edge; and wherein the diagonal dimension is less than or equal to the enclosure inner diameter, and wherein the difference between the inner diameter and the diagonal dimension is approximately 0.52 millimeter.

17. The inflator of claim 16 wherein the difference between the inner diameter and the diagonal dimension is approximately 0.52 millimeter.

18. The inflator of claim 11 wherein the enclosure is substantially cylindrical and has an inner diameter, the tablet body portion is substantially cylindrical and has a diameter, and wherein the difference between the inner diameter and the tablet body diameter is approximately 0.70 millimeter.

19. The inflator of claim 11 wherein the enclosure is substantially cylindrical and has an inner diameter;

the body portion is substantially cylindrical and has an outer diameter;

a height dimension of a gas generant tablet is defined as a distance along the longitudinal axis between a point at which the longitudinal axis intersects the first projection and a point at which the longitudinal axis intersects the second projection; and the difference between the inner diameter and twice the height dimension is approximately 0.64 millimeter.

20. A vehicle occupant restraint system comprising:

an airbag system having at least one airbag and an inflator coupled to the airbag so as to enable fluid communication with an interior of the airbag upon activation of the inflator, the inflator including:

a longitudinal enclosure extending along at least a portion of the housing interior, the enclosure having a substantially uniform cross-sectional area along at least a portion of the enclosure, the at least a portion of the enclosure defining an interior cavity for containing a quantity of a gas generant composition therein, the at least a portion of the enclosure including a plurality of apertures formed therealong to enable fluid communication between the enclosure interior cavity and an exterior of the enclosure; and a plurality of gas generant tablets stacked along the at least a portion of the enclosure, each of the tablets having a body portion and at least one substantially spherical projection extending from the body portion and a land portion extending from a periphery of the body portion toward the longitudinal axis to substantially circumscribe the substantially spherical projection wherein the at least one substantially spherical projection covers a majority of the periphery.

* * * * *

UNITED STATES PATENT AND TRADEMARK OFFICE
CERTIFICATE OF CORRECTION

PATENT NO. : 7,789,018 B2
APPLICATION NO. : 11/096887
DATED : September 7, 2010
INVENTOR(S) : Burns Page 1 of 1

It is certified that error appears in the above-identified patent and that said Letters Patent is hereby corrected as shown below:

Column 8, Claim 3, Line 45, Delete the claim.

Column 8, Claim 4, Line 47, Delete the claim.

Colnmn 9, Line 21, Claim 11; Insert --extending-- after portion.

Column 10, Line 15, Claim 17; Delete the claim.

Signed and Sealed this
Eleventh Day of January, 2011

David J. Kappos
*Director of the United States Patent and Trademark Office*

UNITED STATES PATENT AND TRADEMARK OFFICE
CERTIFICATE OF CORRECTION

PATENT NO.       : 7,789,018 B2  
APPLICATION NO.  : 11/096887  
DATED            : September 7, 2010  
INVENTOR(S)      : Burns Page 1 of 1

It is certified that error appears in the above-identified patent and that said Letters Patent is hereby corrected as shown below:

Column 2, Fig. 2, Line 19; Delete the second "is a".

Signed and Sealed this
Twenty-fifth Day of January, 2011

David J. Kappos
*Director of the United States Patent and Trademark Office*